United States Patent
Takatori (10) Patent No.: US 6,956,618 B2
(45) Date of Patent: Oct. 18, 2005

(54) APPARATUS AND METHOD FOR PROCESSING IMAGE, AND AN IMAGE PROCESSING PROGRAM

(75) Inventor: Yuji Takatori, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 554 days.

(21) Appl. No.: 10/269,068

(22) Filed: Oct. 11, 2002

(65) Prior Publication Data

US 2003/0076443 A1    Apr. 24, 2003

(30) Foreign Application Priority Data

Oct. 22, 2001 (JP) ............................ 2001-323284

(51) Int. Cl.[7] .......................... H04N 5/445; H04N 9/74
(52) U.S. Cl. ....................... 348/564; 348/536; 348/588; 348/598
(58) Field of Search ............................ 348/563–565, 348/567, 584, 586, 588, 589, 598, 600, 536, 348/540, 547, 500; H04N 5/445, 9/74, 5/04

(56) References Cited

U.S. PATENT DOCUMENTS

| 5,914,757 | A | * | 6/1999 | Dean et al. ................. 348/584 |
| 5,999,226 | A | * | 12/1999 | Choi ........................... 348/564 |
| 6,229,573 | B1 | * | 5/2001 | Sato et al. .................. 348/516 |
| 6,532,041 | B1 | * | 3/2003 | Monta et al. ............... 348/468 |

\* cited by examiner

*Primary Examiner*—Sherrie Hsia
(74) *Attorney, Agent, or Firm*—Young & Thompson (57) ABSTRACT

An image processing apparatus, which displays an image corresponding to a synchronizing frequency change-image signal, which is obtained by changing a frequency of a synchronizing signal of an image signal, and an other image corresponding to an other image signal on a same display screen. The apparatus comprises a monitoring device and a synchronizing control device. The monitoring device monitors temporal relationship between the synchronizing signal of the synchronizing frequency change-image signal and a synchronizing signal of the other image signal. The synchronizing control device performs frequency regulation for the synchronizing frequency change-image signal based on the monitoring results from the monitoring device so as to prevent one of the synchronizing frequency change-image signal and the other image signal from passing the other thereof on the display screen.

7 Claims, 9 Drawing Sheets

| NAVIGATION | FRAME | TV |
|---|---|---|
| 1 | 1 | 1 |
| 2 | 2 | 2 |
| 3 | 3 | 3 |
| 4 | 4 | 4 |
| 5 | 4 | 5 |
| 6 | 5 | 6 |
| 7 | 6 | 7 |
| 8 | 7 | 8 |
| 9 | 8 | 9 |
| 10 | 8 | 10 |
| 11 | 9 | 11 |
| 12 | 10 | 12 |
| 13 | 11 | 13 |
| 14 | 12 | 14 |
| 15 | 12 | 15 |
| 16 | 13 | 16 |
| 17 | 14 | 17 |
| 18 | 15 | 18 |
| 19 | 16 | 19 |
| 20 | 16 | 20 |
| 21 | 17 | 21 |
| 22 | 18 | 22 |
| 23 | 19 | 23 |
| 24 | 20 | 24 |
| 25 | 20 | 25 |
| 26 | 21 | |
| 27 | 22 | |
| 28 | 23 | |
| 29 | 24 | |
| 30 | 24 | |
| 31 | 25 | |

FIG. 6(b)

| NAVIGATION | FRAME | TV |
|---|---|---|
| 1 | 1 | 1 |
| 2 | 2 | 2 |
|   |   | 3 |
| 3 | 3 | 4 |
| 4 | 4 | 5 |
| 5 | 5 | 6 |
| 6 | 7 | 7 |
| 7 | 8 | 8 |
| 8 | 9 | 9 |
|   |   | 10 |
| 9 | 10 | 11 |
| 10 | 11 | 12 |
| 11 | 13 | 13 |
| 12 | 14 | 14 |
| 13 | 15 | 15 |
|   |   | 16 |
| 14 | 16 | 17 |
| 15 | 17 | 18 |
| 16 | 19 | 19 |
| 17 | 20 | 20 |
| 18 | 21 | 21 |
|   |   | 22 |
| 19 | 22 | 23 |
| 20 | 23 | 24 |
| 21 | 25 | 25 |

FIG. 6(c)

| NAVIGATION | FRAME | TV |
|---|---|---|
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |
| 9 | 9 | 9 |
| 10 | 10 | 10 |
| 11 | 11 | 11 |
| 12 | 12 | 12 |
| 13 | 13 | 13 |
| 14 | 14 | 14 |
| 15 | 15 | 15 |
| 16 | 16 | 16 |
| 17 | 17 | 17 |
| 18 | 18 | 18 |
| 19 | 19 | 19 |
| 20 | 20 | 20 |
| 21 | 21 | 21 |
| 22 | 22 | 22 |
| 23 | 23 | 23 |
| 24 | 24 | 24 |
| 25 | 25 | 25 |

APPARATUS AND METHOD FOR PROCESSING IMAGE, AND AN IMAGE PROCESSING PROGRAM

BACKGROUND OF THE INVENTION

1. Field of the Invention

The present invention relates to an apparatus and a method for processing image, in which images corresponding to two image signals are synthesized to display the synthesized image on a single display screen, and especially to such an apparatus and method in which a synchronizing control of one of the image signals is made when carrying out a displaying step on the display screen, as well as an image processing program to be used in such an apparatus and method.

2. Description of the Related Art

There has recently been a demand that an image processing apparatus be utilized in various modes. Attention has therefore been given to a function of displaying images corresponding to two image signals on a single display screen. In a certain image processing apparatus having such a function, the respective image signals are separated for respective frame data serving as a unit for display control and stored in a frame memory, and there is made a control of the respective vertical synchronization timings to display the image corresponding to the two image signals. However, utilization of the different image signals may slightly fall out of synchronization as a practical matter.

In view of such a problem, there has been proposed measures called a "passing processing" to control the display timing of the two image signals. Application of the passing processing permits to skip a certain frame of one image signal corresponding to the frame of the other image signal or write twice the same frame, when there exists a deviation in synchronization of the two image signals. This makes it possible to display the images corresponding to the two image signals on the single display screen, even when these image signals are not synchronized with each other in an accurate manner.

However, when the above-mentioned passing processing is utilized, there may be a large possibility that the skipping of the frame or the double writing of the same frame frequently occurs in a state where a deviation exists in synchronization of the two image signals. Such a situation does not cause any major problems when displaying a static image, but causes the problems when displaying a dynamic image. More specifically, the dynamic image may ineptly be reproduced under the influence of the passing processing, thus causing a user to feel that something is wrong, contrary to a manufacturer's intention of displaying the dynamic image smoothly.

SUMMARY OF THE INVENTION

An object of the present invention, which was made to solve the above-mentioned problems, is therefore to provide an image processing apparatus and method, which permits to provide high-grade images as displayed, without giving a user an unpleasant feeling, when displaying images based on two image signals on a single display screen, in case where only a vertical synchronizing timing of one of the two image signals to be processed can be controlled, as well as an image processing program to be used in such an apparatus and method.

In the image processing apparatus of the present invention, a plurality of image signals is to be processed, and it is possible to control a frequency of a synchronizing signal of a synchronizing frequency change-image signal of the above-mentioned plurality of image signals. Temporal relationship between the controllable synchronizing signal and the other synchronizing signal is monitored and frequency regulation is performed on the basis of the monitoring results. This makes it possible to display the images on the same display screen so as to prevent one of the synchronizing frequency change-image signal and the other image signal from passing the other thereof. Even when the frequencies of the synchronizing signals are not synchronized with each other, it is therefore possible to match these frequencies of the synchronizing signals with each other through an appropriate control, thus providing high-grade images as displayed on the display screen.

In the present invention, the frequency regulation may be performed so as to reverse a frequency relationship between the synchronizing signals. According to such a feature, the frequency of the synchronizing signal varies in the opposite direction to the side where the passing of the synchronizing signal occurs, thus preventing the occurrence of the passing of the synchronizing signal in a reliable manner.

In the present invention, the frequency regulation may be performed by increasing or decreasing the number of lines of the synchronizing frequency change-image signal to regulate a frequency of a vertical synchronizing signal of the synchronizing frequency change-image signal. This makes it possible to perform surely the frequency regulation of the synchronizing signal, without making a complicated control of time.

In the present invention, there may be adopted measures that a predetermined temporal range for the frequency regulation of the synchronizing signal is set and the synchronizing control device is disabled from performing further the frequency regulation when a difference in period between the synchronizing signal of the synchronizing frequency change-image signal and the synchronizing signal of the other image signal is within the above-mentioned range. This makes it possible to prevent occurrence of frequent change in frequency, thus maintaining stably the synchronizing signal.

The image processing method of the present invention provides the corresponding effects to those of the image processing apparatus of the present invention.

In the image-processing program of the present invention, with respect to functions of a computer included in the image processing apparatus, a plurality of image signals is to be processed, and it is possible to control a frequency of a synchronizing signal of a synchronizing frequency change-image signal of the above-mentioned plurality of image signals. Temporal relationship between the controllable synchronizing signal and the other synchronizing signal is monitored and frequency regulation is performed on the basis of the monitoring results. This makes it possible to display the images on the same display screen so as to prevent one of the synchronizing frequency change-image signal and the other image signal from passing the other thereof. Even when the frequencies of the synchronizing signals are not synchronized with each other, it is therefore possible to match these frequencies of the synchronizing signals with each other through an appropriate control, thus providing high-grade images as displayed on the display screen.

DETAILED DESCRIPTION OF THE PREFERRED EMBODIMENTS

Now, the preferred embodiments of the present invention will be described in detail below with reference to the accompanying drawings. In the embodiments, the present invention is applied to an image processing apparatus in which image signals that correspond to a navigation image utilized for navigation of a vehicle, on the one hand, and an ordinary image for example of a television set, on the other hand, are processed and these images are displayed on a single display screen.

Figure 1:
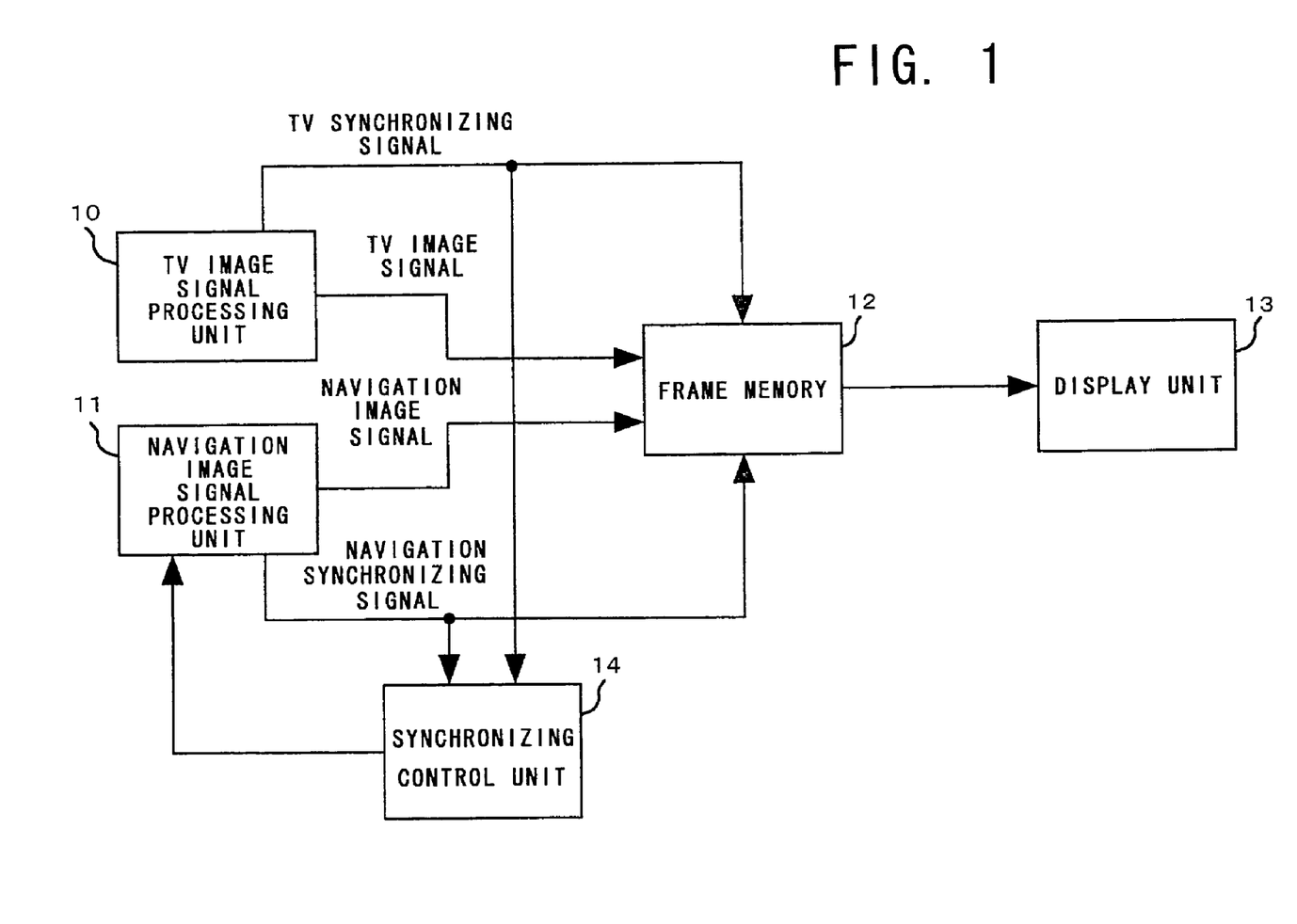
FIG. 1 is a block diagram illustrating essential elements of an image processing apparatus of the embodiment of the present invention.

FIG. 1 is a block diagram illustrating essential elements of the image processing apparatus of the embodiment of the present invention. As shown in FIG. 1, the image processing apparatus comprises a TV image signal processing unit 10, a navigation image signal processing unit 11, a frame memory 12, a display unit 13 and a synchronizing control unit 14 serving as a display unit 13, a monitoring device and a disabling device.

In the above-mentioned elements of the image processing apparatus, the TV image signal processing unit 10 processes a TV image signal supplied from equipment such as a TV tuner, a VTR or the like. The TV image signal processing unit 10 digitizes the TV image signal and separates the TV image signals for the respective frames in accordance with the TV synchronizing signal accompanied with the TV image signal, while matching with a vertical synchronizing timing, and sequentially outputs frame data, of which the respective frames are formed, to the frame memory 12.

The navigation image signal processing unit 11 processes a navigation image signal generated in a navigation apparatus, which is provided integrally with the image processing apparatus. The navigation image signal processing unit 11 digitizes the navigation image signal and separates the navigation image signals for the respective frames having a size, which can be controlled by means of the synchronizing control unit 14, while matching with a vertical synchronizing timing based on the navigation synchronizing signal controlled by means of the synchronizing control unit 14, and sequentially outputs frame data, of which the respective frames are formed, to the frame memory 12.

The frame memory 12 stores the TV image signal and the navigation image signal each digitized as mentioned above for each of the frames. In the embodiment of the present invention, there is a demand that the images corresponding to the TV image signal and the navigation image signal are synthesized based on these signals on the display screen. Accordingly, the frame data including partial data of two kinds of data corresponding to the above-mentioned signals are constructed and the thus constructed frame data are sequentially stored in the frame memory 12. When a predetermined display timing comes in the display unit 13, the reading of the frame data from the frame memory 12 is carried out for each of the frames so that the frame data are sequentially displayed on the display unit 13. In the light of the displaying processing, it is required that the frame memory 12 has a capacity by which at least the frame as currently displayed and the subsequent frame can be stored in the frame memory 12.

The display unit 13, which is formed for example of a liquid crystal panel, is a device for displaying the TV image based on the TV image signal and the navigation image based on the navigation image signal. When the two images are displayed on the display screen of the display unit 13, the TV image and the navigation image are placed in the predetermined regions, respectively, in each of the frames.

The synchronizing control unit 14 monitors the vertical synchronizing timing of the TV synchronizing signal accompanied with the TV image signal and the vertical synchronizing timing of the navigation synchronizing signal accompanied with the navigation image signal, on the basis of these synchronizing signals and judges as whether or not a deviation exists in synchronization of these image signals. In addition, the synchronizing control unit 14 controls the navigation image signal processing unit 11 on the basis of the temporal relationship corresponding to the deviation as judged in synchronization of the image signals to increase or decrease the number of lines included in the frame to be processed. More specifically, the synchronizing control unit 14 increases or decreases the number of lines of the navigation image signal, which is generated in the navigation apparatus.

Figure 2:
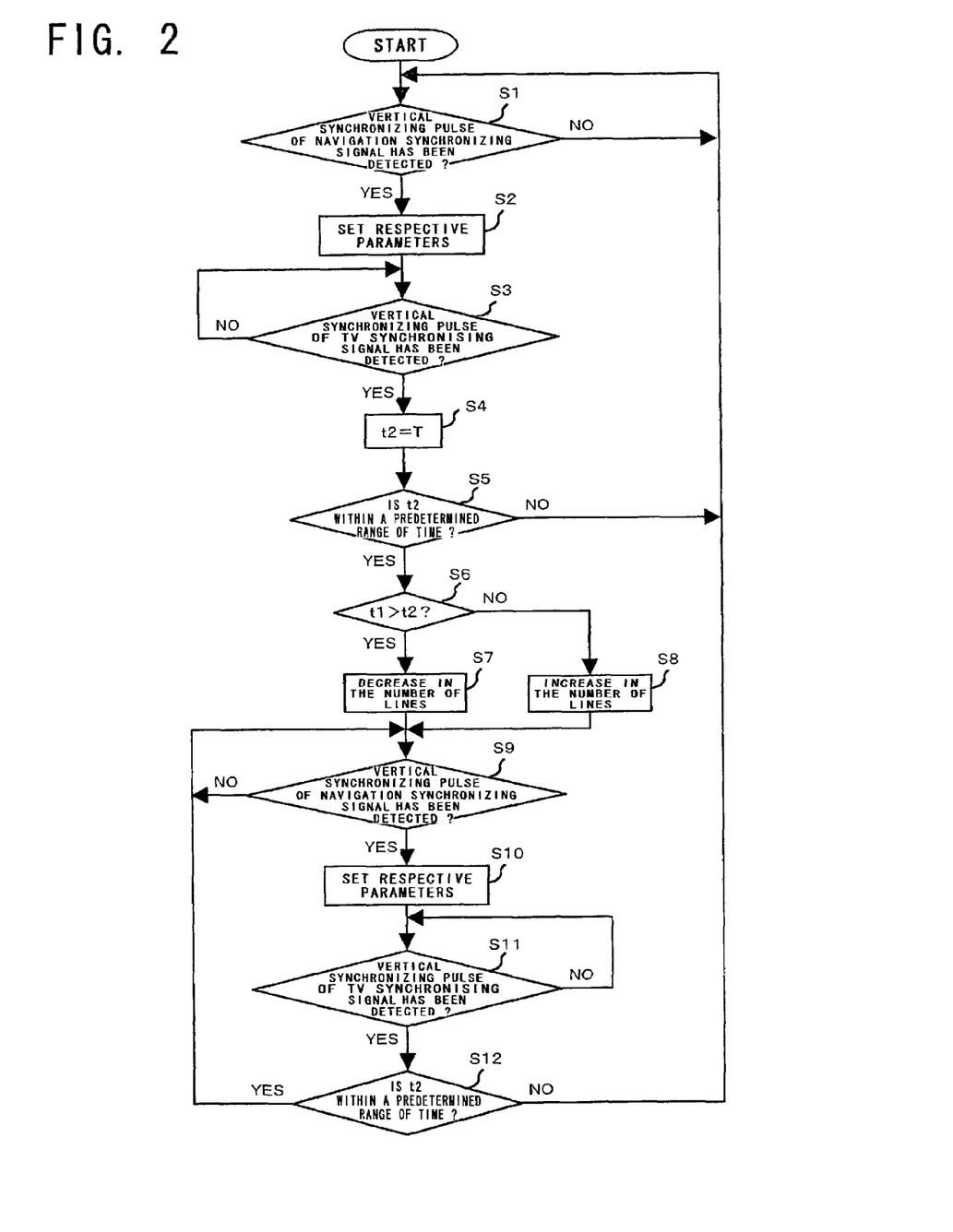
FIG. 2 is a flowchart showing a flow of a synchronizing control processing of the embodiment of the present invention.

Now, the synchronizing control, which is carried out by the synchronizing control unit 14, will be described in detail with reference to FIGS. 2 to 6(c). FIG. 2 is a flowchart showing a flow of the synchronizing control processing of the embodiment of the present invention.

As shown in FIG. 2, the synchronizing control unit 14 first monitors the navigation-synchronizing signal to detect the vertical synchronizing pulse (Step S1).

Figure 3:
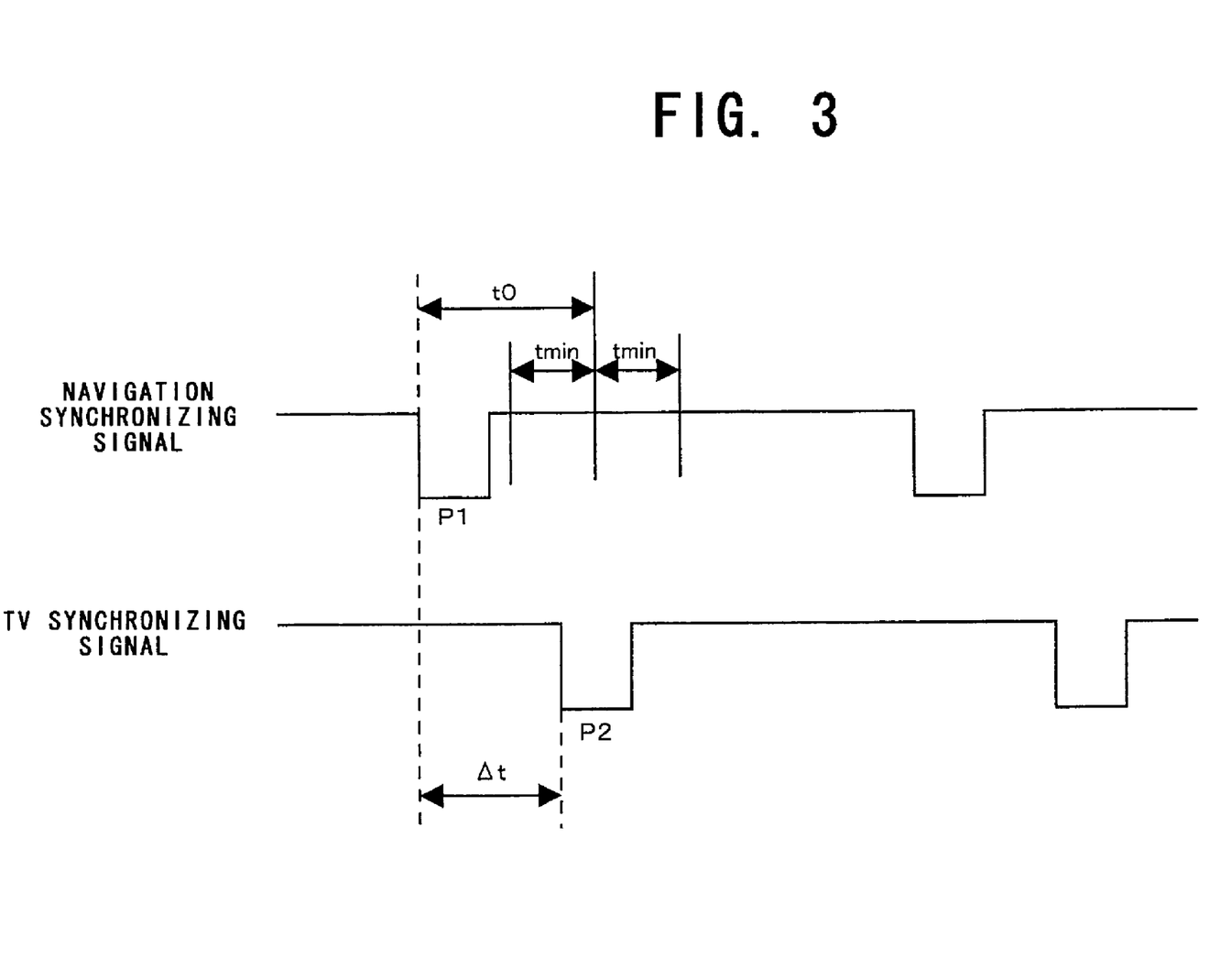
FIG. 3 is a waveform graph illustrating a navigation-synchronizing signal and a TV synchronizing signal in comparison with each other.

FIG. 3 is a waveform graph illustrating the navigation-synchronizing signal and the TV synchronizing signal in comparison with each other. The upper side of FIG. 3 shows the vertical synchronizing pulse P1 of the navigation-synchronizing signal. It is possible to recognize a break of the respective frame on the basis of the vertical synchronizing pulse P1. FIG. 3 illustrates a case where the falling timing of the vertical synchronizing pulse P1 is detected, which is utilized as the timing reference.

When the vertical synchronizing pulse P1 of the navigation-synchronizing signal is detected ("YES" in Step S1), the respective parameters are set at the timing when the vertical synchronizing pulse P1 is detected, to perform the synchronizing control processing by the synchronizing control unit 14 (Step S2). The parameters used in the synchronizing control unit 14 include a time "T" counted by means of a timer provided to measure a time, and the first counted value "t1" and the second counted value "t2" serving as variable as set based on the time "T".

The time "T" is obtained by means of the timer provided in the image processing apparatus. The first counted value "t1" and the second counted value "t2" correspond to a time interval "Δt" as shown in FIG. 3. The falling timing of the vertical synchronizing pulse "P1" of the navigation synchronizing signal is away from that of the vertical synchronizing pulse "P2" of the TV synchronizing signal by the time interval "Δt" as shown in FIG. 3. Consequently, it is necessary to monitor always the time interval "Δt" in order to judge the existence of deviation in synchronization during the frequency regulation described later. In the case of the processing as shown in FIG. 2, of the time intervals "Δt" as judged, the last time interval "Δt" corresponds to the first counted value "t1", the current (latest) time interval, "Δt" the second counted value "t2".

In the setting operation in Step S2, the value "T" of the timer is returned to zero and the setting operation is carried out so that the first counted value "t1" is equal to the second counted value "t2" (t1=t2).

Then, the monitoring step of the TV synchronizing signal is carried out to detect the vertical synchronizing pulse (Step S3). The lower side of FIG. 3 shows the vertical synchronizing pulse P2 of the TV synchronizing signal. It is possible to recognize a break of the respective frame on the basis of the vertical synchronizing pulse P2. FIG. 3 illustrates a case where the falling timing of the vertical synchronizing pulse P2 is detected, which is utilized as the timing reference.

When the vertical synchronizing pulse P2 of the TV synchronizing signal is detected ("YES" in Step S3), the value of time "T" is set for the second counted value "t2" with the above-mentioned falling timing (Step S4). The value corresponding to the above-mentioned time interval "Δt" is set for the second counted value "t2" in Step S4. This makes it possible to detect a deviation in time between the vertical synchronizing pulse P1 and the vertical synchronizing pulse P2.

Then, it is judged based on the temporal relationship between the first counted value "t1" and the second counted value "t2" as whether or not the second counted value "t2" is included in the predetermined range of time to avoid the passing of the signal (Step 5S). In the synchronizing control unit 14, a set value "t0" of time, which is the minimum value of time in which the passing of signal occurs, is already set in connection with an allowable value of the above-mentioned time interval "Δt". More specifically, control is made so that the time interval "Δt" does not reach the set value "t0", on the basis of the falling of the vertical synchronizing pulse P1 of the navigation synchronizing signal, which serves as a basic point. Description of more specific operation will be given later.

In Step S5, it is judged as whether the conditions according to the following formula in relationship between the set value "t0" and the second counted value "t2" are satisfied or not:

$$t0-tmin<t2<t0+tmin \quad (1)$$

In the formula (1), it is necessary to set, as "tmin", a value that is within a range including the set value "t0" and an adequate temporal margin.

With respect to the range of the temporal margin mentioned above in the. embodiment of the present invention, the synchronization of the vertical synchronizing pulse "P1" is adjusted so that, when the time interval "Δt" approaches the set value "t0", the former does not further approach the latter, and more specifically, the time interval "Δt" stands at a value, which goes away from the set value "t0". Consequently, it is necessary to adjust the synchronization of the vertical synchronizing pulse "P1" before the time interval "Δt" exceeds the set value "t0". In order to perform such an adjustment, there is required enough range of temporal margin to carry out at least three processing steps, i.e., the step for detecting the time interval "Δt", the step for judging as whether the time interval "Δt" as detected is varying to exceed the set value "t0" and the step for adjusting the synchronization of the synchronization of the vertical synchronizing pulse "P1" after completion of the above-mentioned judging step.

In the embodiment of the present invention, there is provided the temporary margin of "2tmin" straddling the set value "t0" (the right and left-hand sides of the set value "t0" in FIG. 3), taking into consideration the possibilities that the vertical synchronizing pulse "P2" of the TV synchronizing signal may pass the vertical synchronizing pulse "P1" of the navigation synchronizing signal preceding in time (i.e., from the right-hand side to the left-hand side in FIG. 3) and the former may pass the vertical synchronizing pulse "P1" of the navigation synchronizing signal succeeding in time (i.e., from the left-hand side to the right-hand side in FIG. 3).

In case where it is judged that the formula (1) for the second counted value "t2" does not hold ("NO" in Step S5), the second counted value "t2" stands outside the predetermined temporal range, thus requiring no switching operations. Consequently, the control returns to Step S1.

On the contrary, in case where it is judged that the formula (1) for the second counted value "t2" holds ("YES" in Step S5), the second counted value "t2" stands within the predetermined temporal range, thus requiring the switching operations of Step S6 and the subsequent steps. in the embodiment of the present invention, the synchronizing control is performed when the time interval "Δt" enters the temporal range of "2tmin" as shown in FIG. 3.

Here, a comparison is made in magnitude between the first counted value "t1" and the second counted value "t2" to determine the direction of the passing of the signal (Step S6). More specifically, it is judged as whether the vertical synchronizing pulse "P2" of the TV synchronizing signal approaches the vertical synchronizing pulse "P1" of the navigation synchronizing signal from the right-hand side or the left-hand side as shown in FIG. 3. Comparison of the last time interval "Δt" and the current time interval "Δt" suffices to make such a judgment, thus requiring Step S6.

In case where the formula "t1>t2" holds ("YES" in Step S6), and more specifically, the vertical synchronizing pulse "P2" approaches the vertical synchronizing pulse "P1" from the left-hand side in FIG. 3, the timing of the vertical synchronizing pulse "P2" comes faster than the timing of the vertical synchronizing pulse "P1". Accordingly, a control is made to decrease the number of lines in the frame of the navigation image signal (Step S7), thus increasing the velocity of the navigation-synchronizing signal (i.e., making the frequency high).

On the contrary, in case where the formula "t1>t2" does not hold ("NO" in Step S6), and more specifically, the vertical synchronizing pulse "P2" approaches the vertical synchronizing pulse "P1" from the right-hand side in FIG. 3, the timing of the vertical synchronizing pulse "P2" comes later than the timing of the vertical synchronizing pulse "P1". Accordingly, a control is made to increase the number of lines in the frame of the navigation image signal (Step S8), thus decreasing the velocity of the navigation-synchronizing signal (i.e., making the frequency low).

When the number of lines in the frame is decreased in Step S7, the frame period decreases by the number of lines as decreased, thus increasing the velocity of the navigation-synchronizing signal. On the contrary, when the number of lines in the frame is increased in Step S8, the frame period increases by the number of lines as increased, thus decreasing the velocity of the navigation-synchronizing signal. In case where the navigation synchronizing signal originally has the frequency of 60 Hz, there may be adopted various combination in frequency for the high and low velocity sides, and there may be set the frequencies of 59 Hz and 61 Hz for these sides, respectively.

It is preferable to set a region, in which the number of lines in the frame is increased, outside a displayed zone in the display unit 13. This makes it possible to avoid any influence on the displaying state in the display unit 13 in the embodiment of the present invention, even when the above-described control is made.

In the embodiment of the present invention, the control is made to carry out the switching operation of the velocity of the navigation-synchronizing signal by increasing or decreasing the number of lines in the frame. The present invention is not limited only to such an embodiment, but it is possible to make such a control utilizing the other measures such as the number of dots of a horizontal line and a system clock as controlled.

FIGS. 4(a) to 5(b) are views illustrating the signal waveforms, on the basis of which description will be given of the branching processing as described that is carried out based on the results of judgment in Step S6.

Figure 4A:
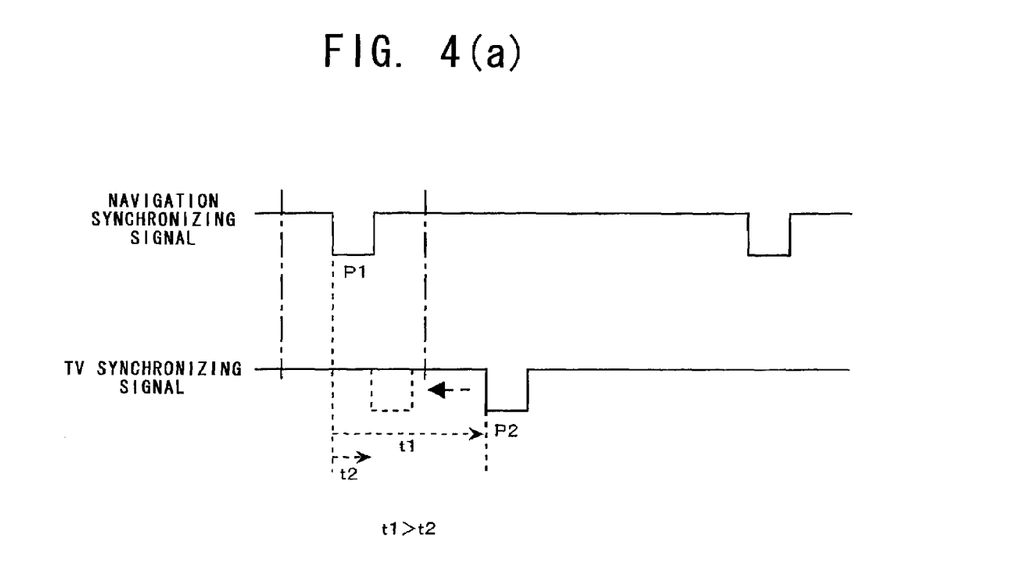
FIG. 4(a) is a waveform graph illustrating an example in which judgment in Step S6 as shown in FIG. 2 reveals "YES" and the passing of a signal occurs.

FIG. 4(a) shows an example of the signal waveform in which the navigation synchronizing signal is lower in velocity (i.e., longer in period) than the TV synchronizing signal, in case where the judgment in Step S6 reveals "YES". As is clear from FIG. 4(a), the vertical synchronizing pulse "P2" of the TV synchronizing signal approaches the vertical synchronizing pulse "P1" of the preceding navigation synchronizing signal according to lapse of time, with the result that the passing of the signal occurs.

Figure 4B:
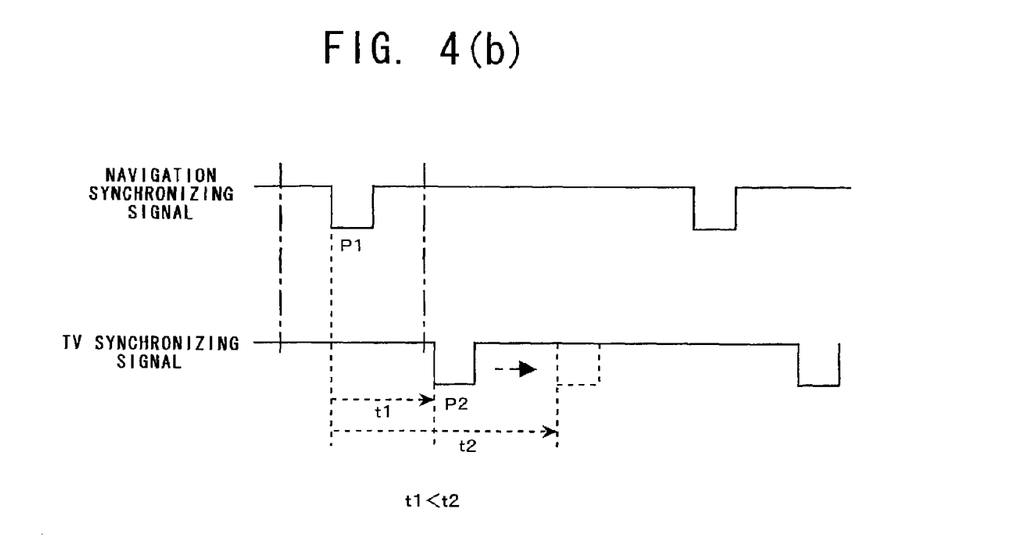
FIG. 4(b) is a waveform graph illustrating an example in which judgment in Step S6 reveals "YES" and the passing of the signal does not occur.

In order to avoid such a passing of the signal, decreasing the number of lines in Step S7 on the basis of the judgment in Step S6 causes the frame period to decrease, as shown in FIG. 4(b), in accordance with the number of lines as decreased, thus switching the navigation synchronizing signal to a high speed side. Consequently, the vertical synchronizing pulse "P2" of the TV synchronizing signal becomes away from the vertical synchronizing pulse "P1" of the navigation-synchronizing signal, thus preventing the passing of the signal from occurring, contrary to the case as shown in FIG. 4(a).

Figure 5A:
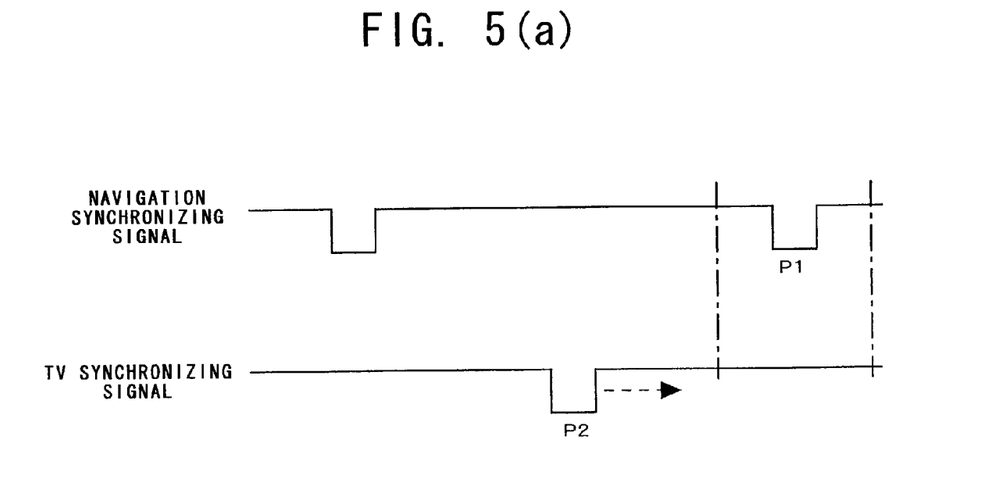
FIG. 5(a) is a waveform graph illustrating an example in which judgment in Step S6 as shown in FIG. 2 reveals "NO" and the passing of the signal occurs.

FIG. 5(a) shows an example of the signal waveform in which the navigation synchronizing signal is higher in velocity (i.e., shorter in period) than the TV synchronizing signal, in case where the judgment in Step S6 reveals "NO". As is clear from FIG. 5(a), the vertical synchronizing pulse "P2" of the TV synchronizing signal approaches the vertical synchronizing pulse "P1" of the succeeding navigation synchronizing signal according to lapse of time, with the result that the passing of the signal occurs in the opposite direction to the case as shown in FIG. 4(a).

Figure 5B:
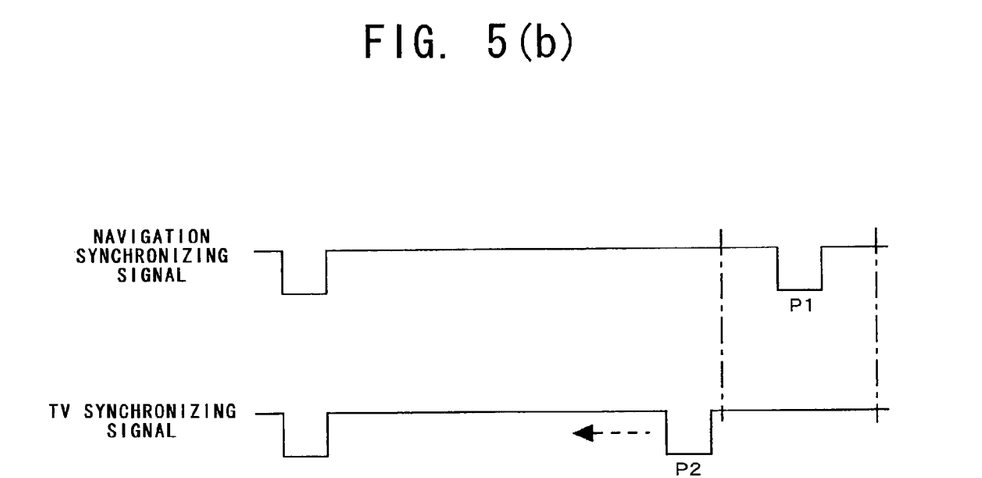
FIG. 5(b) is a waveform graph illustrating an example in which judgment in Step S6 reveals "NO" and the passing of the signal does not occur.

In order to avoid such a passing of the signal also in this case, increasing the number of lines in Step S7 on the basis of the judgment in Step S6 causes the frame period to increase, as shown in FIG. 5(b), in accordance with the number of lines as increased, thus switching the navigation synchronizing signal to a low speed side. Consequently, the vertical synchronizing pulse "P2" of the TV synchronizing signal becomes away from the vertical synchronizing pulse "P1" of the navigation-synchronizing signal, thus preventing the passing of the signal from occurring, contrary to the case as shown in FIG. 4(a).

Consideration is given with reference to FIGS. 4(a) to 5(b), on the assumption that the vertical synchronizing pulse "P1" is fixed. Examples will be given below. When the vertical synchronizing pulse "P2" approaches the set value "t0" from the right-hand side and enters the time range of "2tmin", the frequency regulation of the navigation synchronizing signal causes the vertical synchronizing pulse "P2" leftward so as to be away from the set value "t0". After lapse of the predetermined time, the vertical synchronizing pulse "P2" approaches the set value "t1" from the left-hand side and enters again the time range of "2tmin". More specifically, the vertical synchronizing pulse "P2" is subjected to a reciprocating motion, thus preventing the passing of the signal from occurring.

Then, subsequent to completion of Steps S7 and S8, the navigation-synchronizing signal is monitored to detect the vertical synchronizing pulse "P1" (Step S9). In case where the vertical synchronizing pulse "P1" of the navigation-synchronizing signal is detected ("YES" in Step S9), the setting operation of the timer is carried out again to return the value of time "T" to zero (Step S10).

Then, the TV synchronizing signal is monitored to detect the vertical synchronizing pulse "P2" (Step S11). In case where the vertical synchronizing pulse "P2" of the TV synchronizing signal is detected ("YES" in Step S11 ), it is judged as whether or not the second counted value "t2" is included in the predetermined range of time as described above in the same manner as Step S5 (Step S12). In Steps S12, it is judged as whether or not the formula (1) holds. In case where the formula (1) does not hold ("NO" in Step S12), the control returns to Step S9.

The above-described Steps S9 to S12 prevent an improper adjustment of the navigation synchronizing signal when the time interval "Δt" is within the time range of "2tmin" straddling the set value "t0" as shown in FIG. 3.

Even when the frequency regulation of the navigation synchronizing signal is carried out at the timing in which the time interval "Δt" enters the above-mentioned time range and the time interval "Δt" moves so as to be apart from the set value "t0", there is a possibility that the time interval "Δt" still stays in the above-mentioned time range, depending on the timing of the judgment in the subsequent Step S5. In view of such a possibility, Steps S9 to S12 disable the synchronizing control device from performing further the frequency regulation, when the time interval "Δt" stays in the above-mentioned time range after completion of the frequency regulation of the navigation synchronizing signal.

Figure 6A:
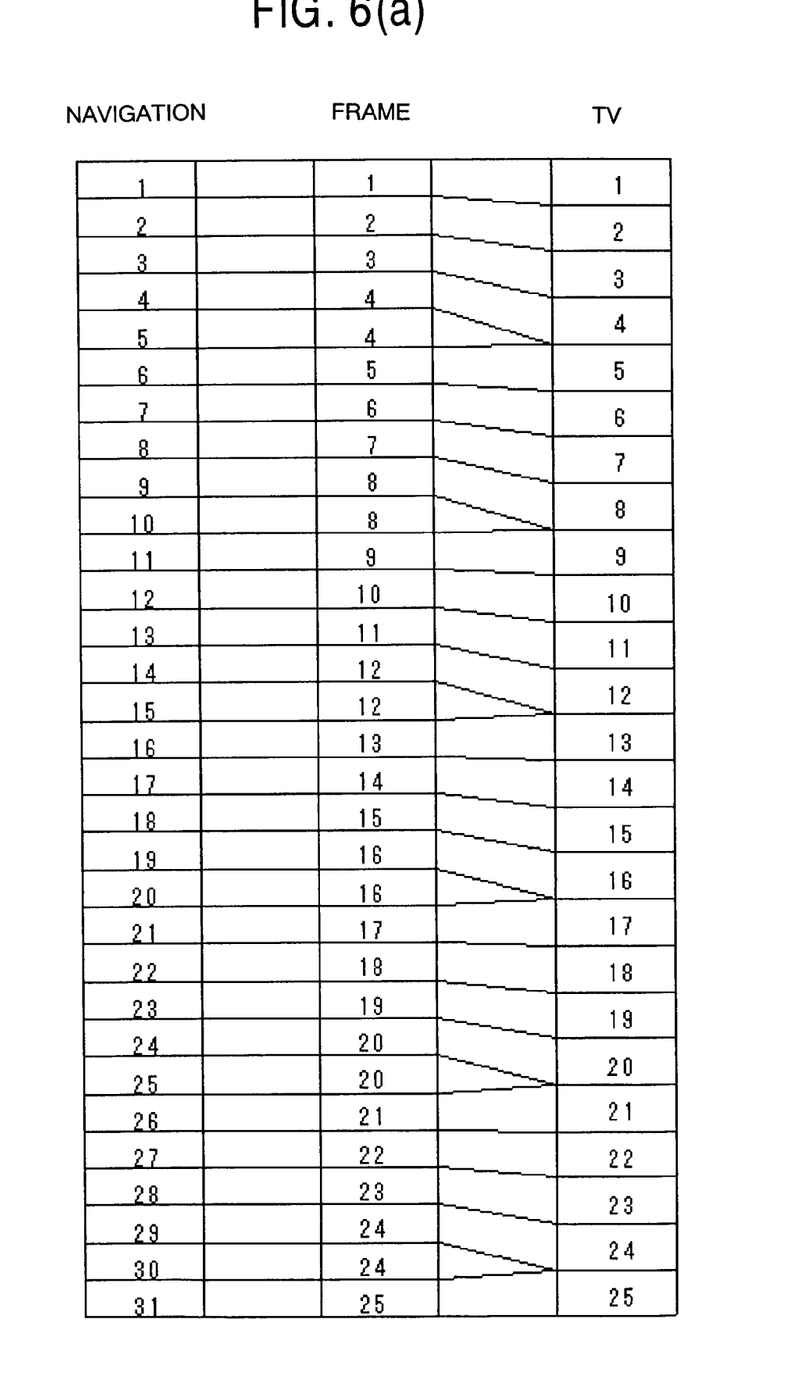
FIG. 6(a) is a chart showing transition of the writing of the navigation image signal and the TV image signal for each of the frame in a frame memory in an application of the conventional passing processing, in which a navigation-synchronizing signal has a higher velocity than that of a TV synchronizing signal.
Figure 6B:
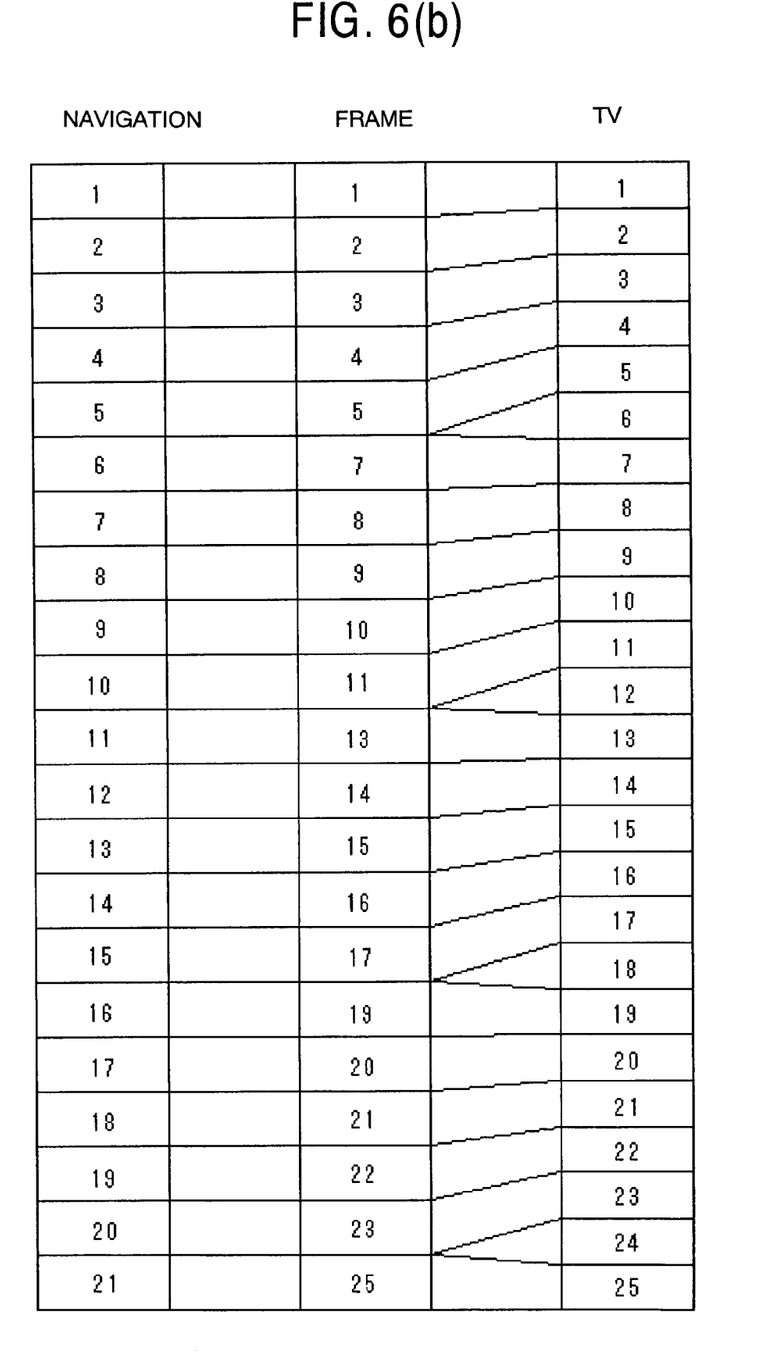
FIG. 6(b) is a chart showing transition of the writing of the navigation image signal and the TV image signal for each of the frame in the frame memory in an application of the conventional passing processing, in which the navigation synchronizing signal has a lower velocity than that of the TV synchronizing signal.
Figure 6C:
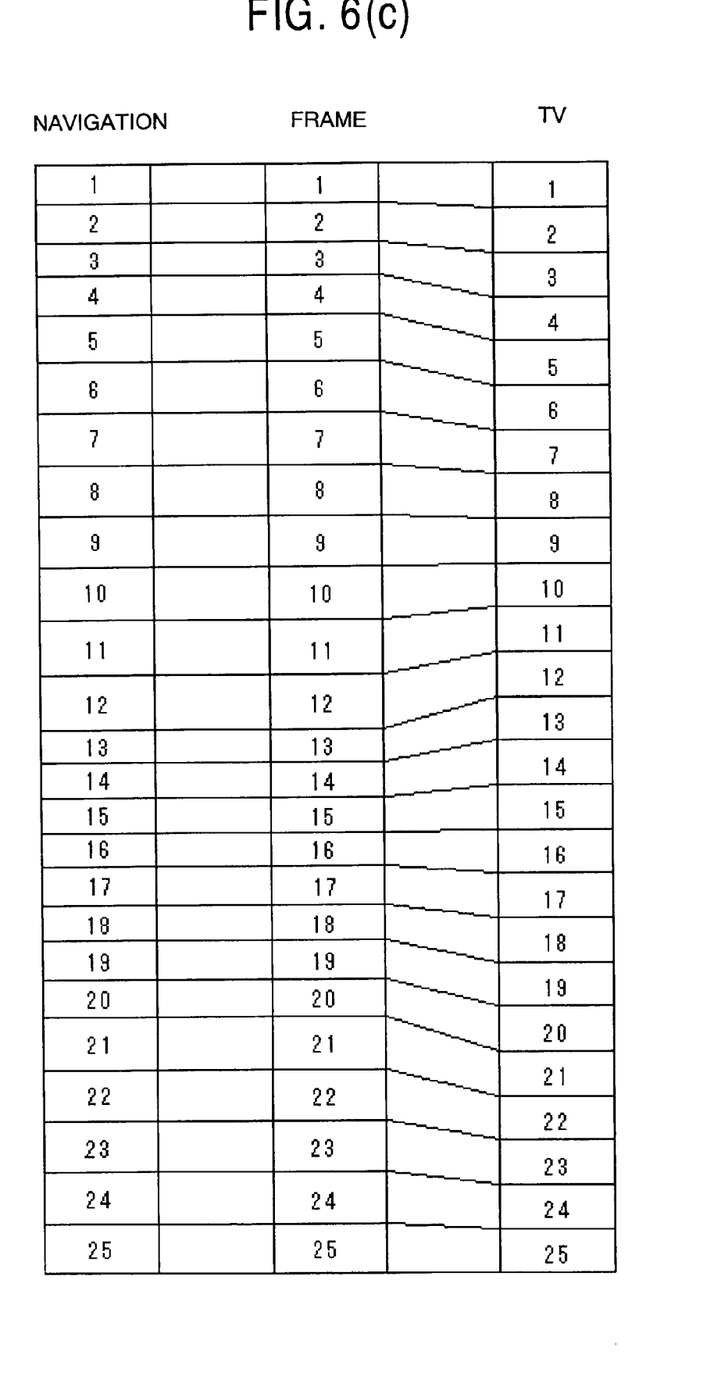
FIG. 6(c) is a chart showing transition of the writing of the navigation image signal and the TV image signal for each of the frame in the frame memory, in which a velocity of the navigation synchronizing signal is controlled in accordance with the processing of the present invention.

A series of Steps S1 to S12 is repeated, thus making it possible to maintain a stable relationship in phase between the navigation synchronizing signal and the TV synchronizing signal, thus preventing the passing of the signal from occurring, even when these signals are different in velocity from each other. Description will be given below of transition of the displayed state for each of the frames, when the display processing of the display unit 13 are carried out in accordance with the controlling method of the embodiment of the present invention, with reference to FIGS. 6(a) to 6(c). FIGS. 6(a) to 6(c) are provided to make a comparison between the case in which the conventional passing processing is applied and the other case in which the processing of the embodiment of the present invention is applied.

FIGS. 6(a) and 6(b) diagrammatically show transition of the writing of the navigation image signal and the TV image signal for each of the frame in a frame memory 12 in an application of the conventional passing processing. Each of the central columns of the charts in FIGS. 6(a) and 6(b) is allotted the frame number, which indicates the processing order of the frame. Each of the leftmost columns of them is allotted the numbers, which indicate the displaying order of the navigation image corresponding to the navigation image signal coinciding with the writing timing. Each of the rightmost columns of them is allotted the number, which indicate the displaying order of the TV image corresponding to the TV image signal coinciding with the writing timing. The writing timing in the frame memory 12 is controlled in synchronization with the navigation-synchronizing signal.

FIG. 6(a) shows the transition of the writing of the signals, in which the navigation-synchronizing signal has a higher velocity than that of the TV synchronizing signal. FIG. 6(b) shows the transition of the writing of the signals, in which the navigation-synchronizing signal has a lower velocity than that of the TV synchronizing signal. In the example as shown in FIG. 6(a), the fourth TV image signal is written twice at the position of the frame number of "4", so as to prevent the navigation synchronizing signal from passing the TV synchronizing signal. The same writing step is carried out in the frames having the number of "8", "12", "16", "20" and "24", which are at intervals of four frames. Alternatively, in the example as shown in FIG. 6(b), the writing of the sixth TV image signal is skipped, so as to prevent the TV synchronizing signal from passing the navigation synchronizing signal at the position of the frame number of "5". The same step is carried out to skip the writing of the twelfth, eighteenth and twenty-fourth TV synchronizing signals.

On the contrary, FIG. 6(c) diagrammatically shows transition of the writing of the navigation image signal and the TV image signal for each of the frame in the frame memory, in which the velocity of the navigation synchronizing signal is controlled in accordance with the processing of the embodiment of the present invention as shown in FIG. 2. In the example as shown in FIG. 6(c), the velocity of the navigation synchronizing signal is properly adjusted in accordance with change in velocity of the TV synchronizing signal. It is therefore possible to prevent occurrence of the passing between the TV synchronizing signal and the navigation synchronizing signal, even when time lapses. As a result, neither double-writing of the same frame as shown in FIG. 6(a) nor frame skipping as shown in FIG. 6(b) occurs at any positions of the frames corresponding to the TV image signals. It is therefore possible to prevent dynamic image from ineptly being reproduced on the display unit 13, thus providing high-images as displayed.

Figure 7:
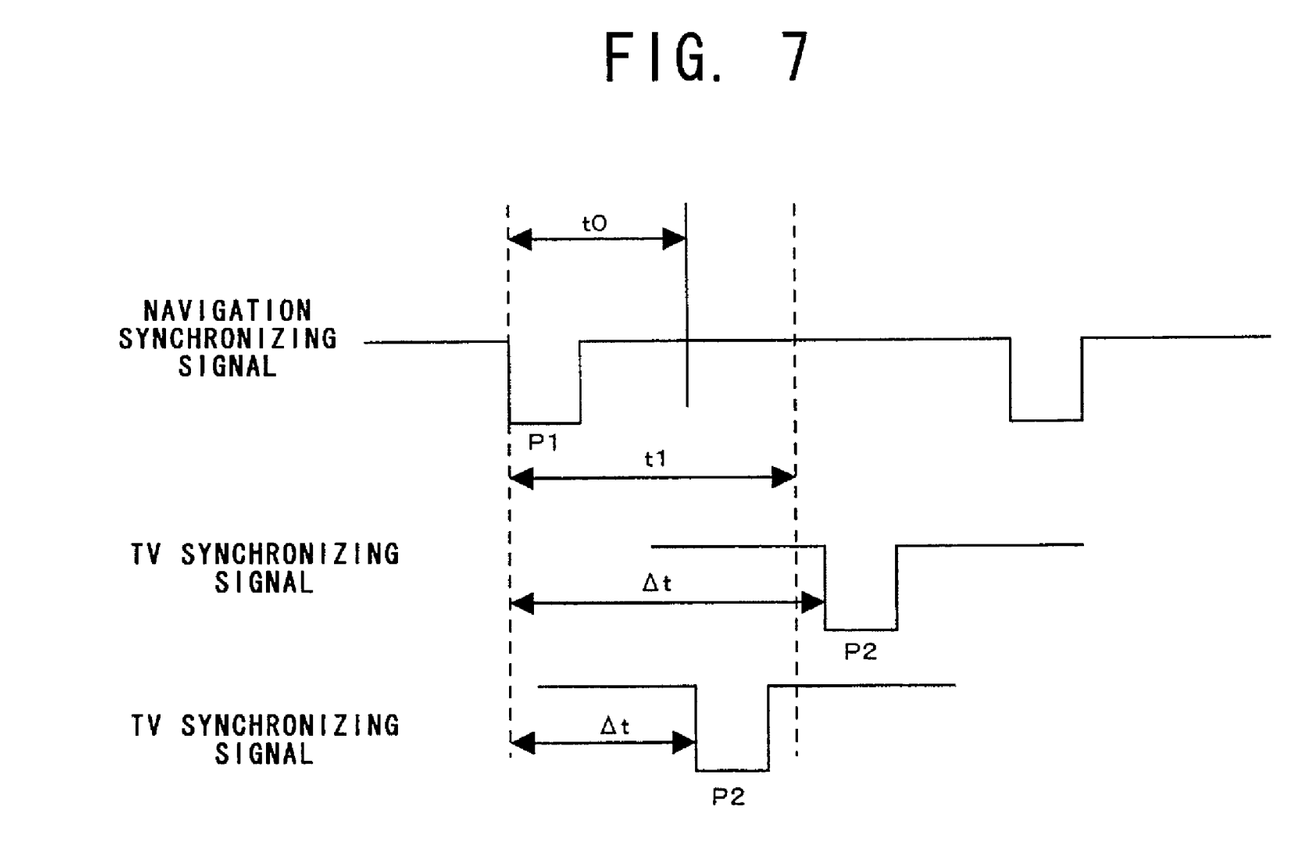
FIG. 7 is a view illustrating modification of the embodiment of the present invention.

Now, a modification of the embodiment of the present invention will be described with reference to FIG. 7. In the above-described embodiment of the present invention, the temporal margin of "2tmin" is provided, taking into consideration the possibility that the passing of the signal may occur from either the right-hand side in FIG. 3 or the left-hand side therein. In the modification as shown in FIG. 7, there is considered only the relationship between a set value as predetermined to be fixed and the time interval "Δt". More specifically, control is made to move the vertical synchronizing pulse "P2" leftward in FIG. 7, in case where Δt>t1, on the one hand, and control is made to move the vertical synchronizing pulse "P2" rightward in FIG. 7, in case where Δt<t1, on the other hand. This ensures a state where a settled interval, which comes close to the set value "t1", always exists between the navigation-synchronizing signal and the TV synchronizing signal in their temporal relationship. The above-described modification provides an advantage of performing the processing through the simple control, although the number of switching step for the navigation-synchronizing signal increases.

In the above-described embodiment of the present invention and the modification thereof, the image processing apparatus processes the two signals, i.e., the TV image signal and the navigation image signal. The present invention is not limited only to them, but may be applied widely to an image processing apparatus, which processes, on the assumption that the vertical synchronizing timing of one synchronizing signal is controllable, the other kind of image signal.

It is possible to cause a microcomputer to function as the synchronizing control unit 14 of the above-described embodiment of the present invention by previously storing a program corresponding to the flowchart as shown in FIG. 2 in an information record medium such as a flexible disc or a hard disc and reading information by means of the microcomputer to execute the program. The above-mentioned program may be supplied through a network such as Internet.

According to the present invention as described in detail, on the assumption that the vertical synchronizing timing of only one of two image signals to be processed is controllable, the vertical synchronizing timings of the respective synchronizing signals corresponding to the above-mentioned two image signals, and a control is made so as to adapt the velocity of the first synchronizing signal to that of the second synchronizing signal, thus providing high-grade images as displayed, without giving a user an unpleasant feeling.

The entire disclosure of Japanese Patent Application No. 2001-323284 filed on Oct. 22, 2001 including the specification, claims, drawings and summary is incorporated herein by reference in its entirety.

What is claimed is:

1. An image processing apparatus, which controls a display screen to display a first image corresponding to a first image signal and a second image corresponding to a second image signal, said apparatus comprising:

a monitoring device for monitoring temporal relationship between a first synchronizing signal of a change-image signal, which is obtained by changing a frequency of said first synchronizing signal of said first image signal, and a second synchronizing signal of said second image signal; and a synchronizing control device for performing frequency regulation for said change-image signal based on monitoring results from said monitoring device so as to prevent one of said change-image signal and said second image signal from passing an other thereof on said display screen.

2. The apparatus as claimed in claim 1, wherein:
said synchronizing control device performs said frequency regulation so as to reverse a frequency relationship between said first synchronizing signal and said second synchronizing signal.

3. The apparatus as claimed in claim 1, wherein:
said synchronizing control device performs said frequency regulation by increasing or decreasing a number of lines of said change-image signal to regulate a frequency of a vertical synchronizing signal of said change-image signal.

4. The apparatus as claimed in claim 1, further comprising:
a disabling device for disabling said synchronizing control device from performing further said frequency regulation when a difference in period between said first synchronizing signal and said second synchronizing signal is within a predetermined range.

5. The apparatus as claimed in claim 1, wherein said apparatus makes said display screen display said first image and said second image at a same time by dividing said screen display into a first area for displaying said first image and a second area for displaying said second image.

6. An image processing method, which displays an image corresponding to a synchronizing frequency change-image signal, which is obtained by changing a frequency of a synchronizing signal of an image signal, and an other image corresponding to an other image signal on a same display screen, said method comprising:
a monitoring step for monitoring temporal relationship between the synchronizing signal of said synchronizing frequency change-image signal and a synchronizing signal of said other image signal; and
a synchronizing control step for performing frequency regulation for said synchronizing frequency change-image signal based on monitoring results from said monitoring device so as to prevent one of said synchronizing frequency change-image signal and said other image signal from passing an other thereof on said display screen.

7. An image processing program, which causes a computer included in an image processing apparatus, which displays an image corresponding to a synchronizing frequency change-image signal, which is obtained by changing a frequency of a synchronizing signal of an image signal, and an other image corresponding to an other image signal on a same display screen, to function as:
a monitoring device for monitoring temporal relationship between the synchronizing signal of said synchronizing frequency change-image signal and a synchronizing signal of said other image signal; and
a synchronizing control device for performing frequency regulation for said synchronizing frequency change-image signal based on monitoring results from said monitoring device so as to prevent one of said synchronizing frequency change-image signal and said other image signal from passing an other thereof on said display screen.

* * * * *